United States Patent [19]

Wilbur

[11] Patent Number: 5,108,772
[45] Date of Patent: Apr. 28, 1992

[54] PUFFABLE CEREAL PELLETS WHICH POP UPON MICROWAVE HEATING AND METHOD OF PREPARATION

[75] Inventor: Donald H. Wilbur, Wayzata, Minn.

[73] Assignee: General Mills, Inc., Minneapolis, Minn.

[21] Appl. No.: 569,809

[22] Filed: Aug. 20, 1990

[51] Int. Cl.⁵ .......................... A23L 1/025; A23L 1/18
[52] U.S. Cl. ...................... 426/559; 426/93; 426/94; 426/309; 426/446; 426/234; 426/242
[58] Field of Search ................. 426/93, 94, 241, 242, 426/302, 309, 446, 449, 450, 559, 234

[56] References Cited

U.S. PATENT DOCUMENTS

| | | |
|---|---|---|
| 3,628,966 | 12/1971 | Katsuya et al. .................. 426/302 |
| 4,767,635 | 8/1988 | Merritt et al. .................... 426/309 |
| 4,880,646 | 11/1989 | Lew et al. ........................ 426/93 |

*Primary Examiner*—Donald E. Czaja
*Assistant Examiner*—John C. Mowbray

*Attorney, Agent, or Firm*—John A. O'Toole

[57] ABSTRACT

Disclosed are puffable gelatinized dough pellets which pop upon microwave heating in a consumer microwave oven. The pellets include an outer skin or casing of sufficient tensile strength to allow buildup of internally generated steam pressure upon microwave heating. Upon sufficient buildup of steam pressure, the skin fails suddenly, allowing the pellet to puff explosively thereby simultaneously causing an audible popping sound. Also disclosed are microwave snack products comprising an expandable microwave popping bag containing a charge of the present microwave poppable pellets. The sound of the popping gives the consumer an audible clue as to the desirable termination of the microwave heating step, which is particularly useful when the pellets are contained within an opaque paper microwave popping bag. Also disclosed are methods for the preparation of the microwave poppable pellets as well as microwave heating methods for snack preparation.

45 Claims, No Drawings

PUFFABLE CEREAL PELLETS WHICH POP UPON MICROWAVE HEATING AND METHOD OF PREPARATION

FIELD OF THE INVENTION

The present invention relates to food products and to their methods of preparation. More particularly, the present invention relates to puffable cereal half products having a defined casing which pop upon microwave heating and to the finished puffed products.

BACKGROUND OF THE INVENTION

Microwave popcorn products are tremendously popular. At present, in the U.S., over 70 different brands of microwave popcorn products are available. Generally, such popcorn products comprise an expandable paper bag containing a charge or matrix of popcorn, fat and salt. A wide variety of products have been developed, including improvements in bag design and variations in salt and fat levels. Flavored fat popcorn products have even been developed, e.g., butter flavored. Improvements have also been made in the kernel popcorn itself, although such improvements have involved primarily, attention to variety selection and post harvesting handling to insure that the percentage of unpopped kernels remain low.

Another approach to provide new and improved microwave products is to provide flavored or coated microwave popcorn products. These products involve including a packet of flavored coating, e.g., dried cheese powder or caramel, which can be sprinkled over the popcorn after completion of the popping step. Again, while popular, the necessity for the extra step of cheese or caramel addition is perceived by the consumer as being inconvenient. To avoid this inconvenient step, two distinct approaches have been taken; namely, developing a self coating package and developing an internally flavored kernel popcorn.

In the packaging approach, the objective is to have a chamber housing the coating material which is separate from the chamber wherein the popcorn is popped. Ideally, the barrier or membrane separating the coating and popcorn would automatically breach after completion of, or late during the popping step. See, for example, U.S. Pat. No. 4,596,713 (issued Jun. 24, 1986 to D. C. Burdette) entitled "Microwave Food Packets Capable of Dispersing a Food Additive During Heating" and U.S. Pat. No. 4,851,246 (issued Jul. 25, 1989 to Maxwell et al.) entitled "Dual Compartment Food Package." While conceptually interesting, the present level of packaging development has not yet provided a commercial product having a packaging design which is consistently inexpensive and adequately performs as desired.

The second approach is to develop internally flavored kernel popcorn and thus avoid the inconvenience of a separate flavor coating step or the engineering limitations of packaging design. Infusion of flavor into the kernel popcorn has been proposed. The popcorn shell, however, provides a formidable barrier to diffusion, especially for larger organic molecules such as are required for more complex or complete flavors. Consequently, notwithstanding the self congratulatory teachings concerning the effectiveness of infusion, such techniques are of limited practical value.

While the various microwave popcorn products are popular, it would be desirable to have even greater variety in texture, flavors and to have flavored snack products of even greater convenience. To this end, the art includes products which comprise pellets which puff upon microwave heating in substitution for popcorn. Such puffable pieces are generally referred to as "half products" in the puffed snack food art. In particular, U.S. Pat. No. 4,251,551 (issued Feb. 17, 1981 to Van Hulle et al.) entitled "Food Composition and Method for Preparing Cheese-Coated Puffed Snacks Upon Microwave Heating" disclosed such a food Product. The product therein described comprises a plurality of puffable pellets matrixed in a flavored fat coating. Upon microwave heating, the pellet importantly, gradually expands to form puffed pieces which are covered with a flavored coating. Similar food products, but having a caramel coating, are disclosed in U.S. Pat. No. 4,409,250 (issued Oct. 11, 1983 to Van Hulle et al.) entitled "Food Composition and Method For Preparing CheeseCoated Puffed Snacks Upon Microwave Heating." Both the '551 and the '250 patents specifically teach avoiding using popcorn due to its unsafe popping characteristics which can splatter the coating material.

While useful, such food product comprising slowly puffable pellets of microwave puffable dough poses certain disadvantages unforeseen at the time of their development; namely, the development of microwave bags for popcorn noted above. In view of the popularity and present familiarity of such microwave popcorn products, it would be desirable to provide substitutes for the present popcorn charge.

One problem with substituting puffable pellets for popcorn in microwave snack preparation is the lack of a sound cue for completion of the microwave heating step. Microwave ovens vary widely in their heating performance due to differences in design, power rating, age, etc. Product preparation instructions thus necessarily give a range of heating times for a given product and rely upon the consumer to determine the desirable end of the heating step. The consumer must rely upon an auditory clue, such as the time interval between popping. Some microwave ovens even have sound detection circuits which automatically conclude the heating step upon cessation or reduction in popping sounds. Pellets which only gradually expand do not make the necessary popping sound and the consumer must rely upon visual clues. Unfortunately, even distinct visual clues are of no value when the pellets are confined in opaque paper popping bags.

One reference teaches coating a puffable pellet of ungelatinized starchy material, e.g., rice, with a thermostable film, e.g., egg albumin, whereupon external heating, (i.e., in contrast to the internal heating produced by microwave heating) the starch is gelatinized simultaneous to setting of the exterior coating. (See Japanese Patent Laid-Open Publication No. 294056/87 entitled "Easily Expansible Food Material" by Katsumi Kataoka). At some point, the buildup in internal steam pressure causes failure of the film coating and puffing of the pellet. However, one disadvantage of such product is that egg albumin is very sensitive to bacterial contamination, and non-enzymatic browning at intermediate water activities.

Given the state of the microwave snack product art, there is a continuing need for new and useful food products useful in the consumer microwave preparation of snack products.

Accordingly, it is an object of the present invention to provide new and useful food products for the at-home consumer preparation by microwave heating of puffed snack foods.

Another object of the present invention is to provide puffable pellets which pop upon microwave heating.

Another object of the present invention is to provide poppable pellets comprising cereal grains and/or flavors other than popcorn.

Another object of the present invention is to provide an internally flavored popcorn having an artificial replacement husk which pops upon microwave heating in a conventional microwave popcorn popping bag.

Still another object of the present invention is to provide a puffable pellet which upon microwave heating provides an audible sound to cue termination of the heating step.

Surprisingly, the above objectives can be realized and superior microwave snack products can be provided which can be flavored and which exhibit an audible sound upon popping. Thus, the present invention provides an improvement in the art of microwave snack products by providing microwave poppable pellets useful in popcorn bags in substitution for conventional popcorn. The half products comprise pellets fabricated from puffable farinaceous materials and further essentially comprise an exterior skin of defined methylcellulose materials at coverage levels sufficient to provide defined thicknesses and tensile strength. The microwave poppable pellets are combined with microwave expandable popping bags to provide consumer microwave snack product articles.

SUMMARY OF THE INVENTION

In one product aspect, the present invention resides in microwave poppable half products. The half product comprises a microwave puffable or expandable pellet having a novel coating which confines expansion upon microwave heating and which exhibits sudden failure. The pellets can comprise a puffable farinaceous material such as a gelatinized dough or dehulled popcorn kernels. The coating is fabricated from certain methylcelluloses. The coating has a thickness ranging from about 0.025 to 0.050 mm.

In another product aspect, the present invention resides in microwave snack products or articles comprising an expansible microwave popping bag housing a charge of the present microwave poppable pellets.

In one method aspect, the present invention provides methods for preparing the present microwave poppable pellets. The method comprises 1) providing a plurality of microwave expandable pellets, and 2) applying to the pellets a dilute aqueous solution of methylcellulose with simultaneous drying in amounts sufficient to coat the pellets to form a coating layer having a thickness of about 25 to 50 microns.

In another method aspect, the present invention resides in microwave methods for preparing microwave snacks which comprises the step of microwave heating the present microwave snack half products.

DETAILED DESCRIPTION OF THE INVENTION

In its product aspect, the present invention resides in microwave poppable half products, in microwave snack products comprising a microwave popcorn bag housing a change of the present microwave poppable half products, and in the finished puffed snack foods themselves.

In its method aspect, the present invention resides in methods for Preparing the present microwave poppable pellets and in microwave preparation methods for snack preparation. Each of the product components and method(s) steps as well as product use are described in detail below.

Throughout the specification and claims, percentages are by weight and temperatures in degrees Fahrenheit unless otherwise indicated.

The present food compositions essentially comprise a plurality of discrete puffable pieces which further essentially comprise a particular coat or shell with a casing or coating of sufficient textural strength to contain internal steam pressure buildup and which is subject to sudden failure, which coating is described in detail below. By the term "puffable" it is meant the ability of the "pieces" to expand in volume upon microwave heating at conventional consumer oven frequencies (for example, 2450, 915 or 819 MHz) and power densities and to retain at least twice their original volume (hereinafter "2X") upon cooling. By "power density" is meant the gross power per volume of cavity, i.e., $W/cc^3$ For example, a typical 700 W, 1.5 $ft^3$ consumer microwave oven has a power density of about 0.25 $W/cc^3$. The skilled artisan will appreciate that the specific power density, i.e., within a specific microwave oven, will vary with ovens being generally designed to have the highest specific density in the center of the oven. The term "piece" is used herein to refer in part to a shaped, gelatinized dough product which has not yet been subjected to sufficient heat to cause the product to puff. The term "pellet" is used herein to refer to highly preferred puffable piece embodiments of roughly spherical shape and generally weighing between 0.01 and 6 grams. In the following description, it is to be understood that puffable pieces of various rounded shapes, e.g., egg shaped, ellipsoid, etc. can be used even though spherical pellets are specifically described. The term "half product" is used herein in its art recognized meaning and embraces both pieces fabricated from puffable farinaceous doughs as well as dehulled, unpopped popcorn kernels.

A wide variety of puffable pellets are known in the art. Generally, such puffable pellets can comprise cooked or gelatinized cereal doughs containing various amounts of farinaceous materials such as starches and cereal flours.

The poppable pellets herein are prepared from puffable gelatinized farinaceous doughs which have moisture contents essentially ranging between about 5% to 20% by weight of the pellets dough, preferably from between about 9% to 15% and, most preferably, between about 11.5% and 12.5%. Maintenance of pellet dough moisture contents within the above given ranges is important to insure sufficient moisture to puff the pellets without scorching and to insure extended pellet shelf storage stability.

The art is replete with compositions suitable for use as the dough from which the puffable pellets are prepared and the skilled artisan will have no problem formulating particular suitable doughs and fabricating suitable pellets. For example, suitable doughs for the pellets are disclosed in U.S. Pat. Nos. 3,246,990 (issued Apr. 19, 1966 to J. J. Thompson et al.), 3,464,827 (issued Sep. 2, 1969 to T. Tsuchiya et al.), 3,600,193 (issued Aug. 17, 1971 to E. F. Glable et al.), and 3,666,511 (issued May 30, 1972 to L. D. Williams et al.) and especially in 3,652,294 (issued Mar. 28, 1972 to N. G. Marotta et al.) each of which is incorporated herein by reference.

Surprisingly, in one highly preferred embodiment, the puffable pellets can comprise conventional, unpopped, dehulled popcorn. The skilled artisan will appreciate that infusion of large molecules, such as for color and flavor, is extremely difficult. Dehulling of the popcorn provides a popcorn kernel which modestly can more readily be infused with flavors, salts and/or color. The dehulled popcorn can be more readily infused with more satisfying but more complex flavors such as butter, sour cream, onion, cheese flavors, once the pericarp has been removed. In more preferred embodiments, the present half products comprise flavor infused, especially salt, dehulled popcorn kernels.

Generally, the puffable farinaceous doughs comprise one or more farinaceous materials. The farinaceous materials can include the flours and/or starch fraction derived from various cereal grains or tuber flours or starches such as those of corn, wheat (hard or soft), rice, buckwheat, arrowroot, tapioca, potato, oat, barley, rye or any combination of two or more. If present, such farinaceous materials can comprise from about 1% to over 90% (dry weight basis) of the present doughs.

A variety of materials can be added to the preferred puffable doughs to make the present puffed snacks more nutritious and more aesthetically or organoleptically desirable. Major optional ingredients usefully added to the preferred doughs include sucrose, shortening and common salt.

Sucrose is a highly preferred optional component of the pellet dough. If present, sucrose can comprise from about 0.1% to 15% of the dough and preferably between about 5% and 11%. Surprisingly, doughs containing sucrose exhibit increased puffing ability when puffed by microwave heating.

Another highly preferred optional component of the present pellet doughs is common salt. In addition to its seasoning function, salt surprisingly has a beneficial effect upon the puffing ability of the pellet amylopectin doughs even in the presence of sucrose. If present, salt comprises from about 0.1% to 10% of the pellet dough, preferably between 0.5% to 5% and most preferably between 1% and 2%.

Most surprisingly, conventional fatty triglycerides, i.e., fat, oils and shortenings can be added to the pellet amylopectin doughs without significantly affecting puffability. If present, such shortenings can comprise from about 0.1% to 5% of the doughs. Suitable conventional shortening materials include, for example, edible fatty triglyceridic materials derived from cottonseed oil, soybean oil, coconut oil, peanut oil and the like. Typically, such materials are partially hydrogenated to Iodine Values of less than about 90 to increase storage stability. Other suitable shortening materials and methods of preparation are described in Bailey "Industrial Oil and Fat Products," Interscience Publishers, a division of John Wiley & Sons (3rd Edition, 1964) which is incorporated herein by reference. If employed, however, it is important that the fat component be worked uniformly into the dough rather than oiling out to the pellet surface. Such oiling out of the fat layer can adversely affect the adherence of the popping casing to the pellet. Conventional emulsifiers can be used to facilitate preparation of a dough with the fat uniformly dispersed.

Minor optional pellet dough ingredients include, for example, colors, dyes, flavors, vitamins, preservatives and the like. If present, such minor optional components comprise from about 0.1% to 2% by weight of the pellet dough.

Nonfat dry milk solids or conventional cheese solids are to be avoided in the pellet doughs since such materials undesirably contain reducing sugars. Doughs containing both reducing sugars and protein can undesirably undergo non-enzymatic browning reactions upon microwave heating.

Generally, the essential dry materials such as starch(es) together with other optional ingredients such as cereal flour(s), sugar and salt are combined with water and are formed into gelatinized doughs. Such gelatinized doughs, of course, can be prepared in various well-known manners. For example, gelatinized doughs can be simply prepared by admixing water and pregelatinized starchy materials. Pregelatinized materials generally, and for purposes of the present invention, are those which swell in water which is at a temperature of 25° C. to the extent that one gram of the starch will absorb at least about 10 grams of water. This determination may be conducted by dispersing one gram of pregelatinized starch material and 100 mm of water (at 25° C.) which is contained in a 100 mm graduated cylinder and thereafter noting the volume displacement by the sediment which is formed. A sediment volume of at least 10 mm qualifies the gelatinized starchy material as one suitable for use herein.

Alternatively, gelatinized doughs can be prepared by cooking to gelatinize doughs of ungelatinized materials. Other choices include using some pregelatinized material in combination with other ungelatinized materials which have been separately cooked and the two materials thus separately gelatinized are mixed together to form a gelatinized dough.

When ungelatinized material is used, the cooking or gelatinizing of the starch material is performed under conditions commonly used in the food industry. Either a batch cooking or continuous cooking operation can be used. Different methods of cooking include heating at atmospheric pressure in an agitated kettle, heating at elevated pressure in a tumbling type mixer and heating under high pressure in a continuous mixer-extruder.

The preferred method herein of gelatinizing the starch material is by cooking in an extruder under pressure. Such a process is both continuous and flexible. For example, pregelatinized material, if used, can be simultaneously blended with the other starch material to yield an homogeneous gelatinized dough. Additionally, the use of higher pressures attainable in the extruder allow the use of higher temperatures and also lower water levels than are possible with a batch type cooking operation. The use of lower water levels thus minimizes the amount of drying required in subsequent steps. For example, using an extrusion type process at 100 to 200 psig at about 250° to 350°, 12% to 25% water based on the total moisture is sufficient to gelatinize the dough.

The gelatinized dough can be thereafter shaped into any desired rounded form of individual or discrete puffable pieces although spherical pellets are preferred. Also useful herein are other rounded shapes, e.g., egg shaped or ellipsoid, i.e., pellets having a low aspect ratio (length to width) preferably less than about 2:1 and more preferably less than 1:1. However, other shapes, e.g., cylindrical, rings, stars, etc., should be avoided since such non-rounded shapes fail to pop satisfactorily. Deficient popping can include the puffed pieces having partially unexpanded, hard portions. For the preparation of small pellets, the dough can be extruded in a wide variety of equipment and the extrudate cut off in the form of small pellets ranging in size between about 2 mm to 20 mm in diameter and generally weighing between 0.01 to 6g. Preferred for use are pellets ranging in size from about 0.05 to 0.5 g in weight, and for best results about 0.1 to 0.2 g in weight.

After such shaping/sizing, the gelatinized dough pellets can be adjusted (e.g., partially dried) to a suitable puffing moisture within the essential 5% to 20% total moisture content range. Any method of conventional drying can be used to reduce the moisture content of the pellets. The drying operation can be accomplished using equipment such as rotary bed, tray and belt dryers to form the present dried dough pellets. Simple hot air convection drying is the preferred method of pellet drying.

The drying process must be controlled so that the moisture transfer to the atmosphere of the dryer from the pieces is more or less uniform so as to provide uncasehardened pellets having moisture contents within the present desirable range. If the moisture loss occurs only from the outer surface of the pellets while the inner portion of the pellets retains moisture, then the total moisture of the pellets may be within the required 5% to 20% range but the pellets will not puff or expand properly during puffing. This poor puffing results from the starch material in the outer portions of the preformed pellets having little or no moisture with which to expand during the microwave puffing step, i.e., casehardened. If the air convection drying operation is carried out at about 70° to 200° F. (relative humidity at least 35%) the pellets will be dried within about four hours and the moisture distribution within the pellets will be proper.

The pellets essentially further include a defined shell or casing completely surrounding the pellet. Importantly, this shell is both continuous or imperforate and is of sufficient structural strength to withstand internal pressure buildup of steam when the pellets reach internal pressures associated with temperatures of up to 250° F. The shell should also exhibit sudden failure rather than gradually dissolve, stretch, or give away.

The present shells are fabricated from certain carboxycellulose materials. In particular, the present cellulose materials are characterized in part by being of the "A" type, i.e., only methyl substitution, i.e., pure methylcellulose. Other cellulose derivatives, e.g., hydroxypropyl, (i.e., those materials referred to as types E, F, or K) do not possess the requisite tensile strength to provide the features herein. Furthermore, shells fabricated from the present methylcellulose materials have been found to provide superior coatings in terms of high pop success rates compared to fabrication of otherwise comparable skins of a wide variety of other edible film forming materials employed at comparable weights of usage, e.g., egg white or other protein based edible polymeric films. Thus, in preferred embodiments the present invention importantly resides, in part, in the surprising discovery that methylcellulose is surprisingly superior to other polymeric film forming ingredients which are otherwise recognized as being similar. Indeed, methylcellulose is surprisingly superior even to other substituted carboxycellulose materials.

In the more preferred embodiments, the present methylcellulose coating materials are further characterized by a 27.5% to 31.5% degree of methoxy substitution. That is, about 1.8 molecular weight basis of the three hydroxy groups have been substituted with methoxy groups. The coating material is further characterized by an average molecular weight of about 30,000 to 70,000, preferably about 40,000 to 50,000, and for best results about 41,000 (i.e., having a viscosity of 400 cp.). Viscosity is commonly used as a proxy measurement of molecular weight for cellulose derivatives. A higher molecular weight product (Mol. Weight 63,000; viscosity 1500 cp.) can also be used herein but is more difficult to apply due to its high viscosity. Surprisingly, the present defined coating material provides superior coatings herein compared to a wide variety of otherwise generally recognized as equivalent film forming materials.

The coating material is applied as a dilute cold (i.e., 45° to 75° F.) aqueous solution (e.g., 1% to 3%, preferably about 2%) in sufficient amounts to provide upon subsequent drying a coating capable of continuing internal steam pressure at 212° F. and which fails suddenly at higher steam pressures such as are generated by internal steam pressures at >250° F. Good results in terms of adequate casing strength with the ability to suddenly fail are obtained when the coating material is applied to a dried thickness ranging from about 25 to 40 microns. Coatings of inadequate thickness can result in coated pellets exhibiting poor percentages of pellets which pop. Pellets coated with excessively thick coatings upon popping can exhibit a visually undesirable coating residue. Moreover, as thicknesses increase, the coating ingredient costs increase as well as the duration and cost of the coating operation. Better overall performance results are obtained when the coating ranges in thickness from about 28 to 36 microns, and for best results about 32 microns.

The coating step can be practiced using conventional coating techniques such as enrobing or, preferably, panning. Generally, panning involves charging a quantity of pellets to a rotating panner, such as a side vented (perforated shell) panner and applying the coating solution with simultaneous drying, e.g., air or hot air, so that the pellets never get tacky. In the preferred embodiments, the dried coated pellets so formed have a coating weight of about 3%±0.5.

In one less preferred but still useful embodiment, the coating step comprises a two-step application of a first portion of the coating solution in a rotating inclined panner with subsequent finish drying followed by a second or several additional steps wherein the balance of the coating material is applied, followed by one or more finish drying steps.

The coated pellets of the present invention so prepared exhibit good pop success rates upon heating in a conventional consumer microwave oven and are useful for the microwave preparation of fresh snack products. Pop success rates of 70% and above are obtainable. It is an advantage of the present invention that even those pellets which fail to audibly pop nonetheless generally expand upon microwave heating to form edible snack pieces in contradistinction to unpopped or dead popcorn kernels. The present half products are thus useful per se and can be appropriately packaged for distribution and sale whether in bulk for commercial buyers or in small quantities for retail sales.

In another aspect, the present invention resides in microwave snack product articles comprising a microwave expandable bag or popcorn bag housing a charge of the present microwave poppable pellets. Generally, a microwave popcorn bag is an expansible package derived from a tubular stock having its opposite ends sealed forming a compartment. The tubular stock constitutes a conventional laminated kraft paper and glassine paper or similar material. A wide variety of expansible microwave bags or packages are known generally having an opposed pair of pleated side gussets and generally further having a microwave susceptor patch intermediate the layers to provide auxilliary heating to popcorn kernels. (See, for example, U.S. Pat. No. 4,450,180, issued May 22, 1984 to J. D. Watkins, entitled "Package for Increasing the Volumetric Yield of Microwave Cooked Popcorn" which is incorporated herein by reference.) However, in the preferred embodiment, microwave bags are free or devoid of the conventional microwave susceptor metallized film heater patch typically sandwiched between the layers of kraft paper. The presence of the susceptor patch can undesirably result in scorching of the pellets upon microwave heating which in turn can adversely affect popping performance as well as end product appearance and flavor. Thus, in more preferred embodiments, microwave package articles of the present invention essentially comprise a susceptor free microwave expandable bag housing a charge of the present poppable pellets. Upon microwave heating, a large percentage of the pellets audibly pop. The substantial cessation of the popping sounds indicates the desirable termination of the microwave heating step. Upon completion of the heating step, a delightful puffed snack product is obtained.

The present half products are particularly suitable for use in connection with opaque bags since the popping gives an audible clue to the desirable termination of the microwave heating step. However, the present half products can also, of course, be used in combination with a bag at least a portion of which is transparent.

In another variation of the present invention, a mixture of popcorn and the present poppable pellets can be employed.

In another embodiment, the products further comprise a fat based flavor sauce mixed with the pellets. Desirably, the weight ratio of flavor sauce to half product pellets is low, e.g., less than about 0.20:1, preferably less than about 0.11:1.

The present poppable pellets are not particularly suitable for use in connection with rapid heating by immersion heating with a cooking oil. The elevated temperatures and the oil cause the film to weaken leading to poor pop rates although the pellets will expand to form puffed snack products.

The present microwave bag articles can further comprise a fat charge which is an essential component of conventional microwave popcorn articles. Free salt or a topically applied salt coating to the pellets can optionally be used. Furthermore, while not preferred, the present poppable pellets can be used in some consumer hot air popcorn popping devices.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure.

EXAMPLE 1

A puffable pellet product of the present invention reminiscent of popcorn was prepared according to the following procedure. A gelatinized dough was prepared having the following composition (dry basis):

| Ingredient | Weight % |
| --- | --- |
| Corn flour | 35.92 |
| Wheat starch | 34.48 |
| Tapioca starch[1] | 17.24 |
| Rice flour | 8.62 |
| Sugar | 1.87 |
| Salt | 1.39 |
| Calcium carbonate | 0.31 |
| Trisodium phosphate | 0.17 |
| | 100.00% |

[1] A modified tapioca starch available from A. E. Staley & Co. under the trade name "Tenderfil 9".

Generally, the ingredients were preblended in a ribbon blender and fed to a Baker Perkins twin screw extruder cooker with water to form a gelatinized dough and extruded to a single screw pelletizing extruder and were formed into slightly ellipsoid pellets about 0.25 inch in More specifically, the dry feed rate to the extruder was set at 5.0 lbs per minute. Water was added immediately downstream from the dry feed port at a rate of 0.66 to 0.75 lbs per minute.

The gelatinized dough exited the extruder through a die plate with two outlet holes fitted with one-quarter inch nominal pipe size tubing and ball valves. The dough was belt conveyed approximately twelve feet, and fed into a hot water jacketed, single screw pelletizing extruder. The pelletizing extruder consists of a 32 inch long screw with a 3 inch pitch, operating inside a grooved barrel with a 5.25 inch inside diameter. The speed of the rotating screw was adjusted to maintain a flow rate through the pelletizing extruder that closely matched the product flow rate out of the twin screw cooking extruder. Dough was forced through a die plate mounted on the discharge end of the pelletizing extruder. The die plate consists of a metal disk which contains 105 holes 5/32" or 0.15625 inch in diameter, arranged in a circular pattern. Dough exiting from the die plate was cut by a blade rotating around the same axis as the screw, driven by a variable speed motor. Speed of the cutter was adjusted to cut the extruded dough into slightly ellipsoid pellets, approximately 0.25 inch in diameter. Moisture of the pellets was 19% to 23%, and the pellets were air conveyed to a moving bed drying oven. The pellets were air dried by forced convection at 170° F. for 90 minutes. Moisture of the pellets was 11% to 13% after drying.

The dry pellets were then coated with a film of methylcellulose in a side vented coating pan. Pellets weighing 19 pounds were placed in a 24 inch diameter Model 24-MC Accela-Cota coating pan from Thomas Engineering Inc. of Hoffman Estates, Illinois.

Heated air was supplied to the coating pan at 170° to 180° F. through two inlets. Moist air was exhausted from the pan by a 1 hp exhaust blower. Temperature of the exhaust air was maintained at 102° to 106° F.

Coating solution was a 2% solution of methylcellulose, available from Dow Chemical Company as Methocel type A4C. The coating solution was prepared by adding 0.75 lbs of methylcellulose to 18.0 lbs of water previously heated to 200° F. The slurry was agitated at high speed with a dispersion type agitator for 10 minutes, then 19.0 lbs of ice was added quickly to the mixture. Agitation was reduced to avoid incorporating air into the mixture as the methylcellulose went into solution. Coating solutions were stored at 40° F.

Coating solution was delivered to the coating pan using a tube roller style pump and an atomizing spray nozzle. The coating solution was maintained at 40° to 60° F. in a water chilled vessel to reduce heat induced precipitation of the methylcellulose solution at the atomizing nozzle. Coating solution was added continuously to the coating pan at a rate of approximately 0.094 lbs per minute. The dry weight of the methylcellulose coated on the pellets was 2.7% of the weight of the uncoated pellets. The time required to coat the pellets was 4.75 hours. Using this technique, there was no net change in the moisture content of the pellets. Pellets were stored in polyethylene bags and protected from extreme temperature and humidity changes.

Coated pellets were used to prepare a microwave snack similar to popcorn. A flavored sauce was formulated to give the snack a pleasing fried and buttery flavor employing commercially available flavors. A premix of color lakes was prepared to give the flavored sauce a pleasing color similar to butter.

| Color/salt premix | |
|---|---|
| FD&C yellow lake #5 | 0.25 g |
| FD&C yellow lake #6 | 0.05 g |
| Salt - extra fine | 33.70 g |
| | 34.00 g |

Colors and salt were dispersed by grinding with a mortar and pestle. The sauce mix was prepared according to the following formula, using 1.53 g of a flavor premix and 5.0 g of the color/salt premix. Soybean oil was melted at 120° F. and lecithin was added as a dispersion aid.

| Sauce mix | |
|---|---|
| Soybean oil, partially hydrogenated | 93.20 g |
| Color/salt premix | 5.00 g |
| Flavor premix | 1.53 g |
| Lecithin | 0.27 g |
| | 100.00 g |

The mixture was blended at 3,000 rpm using a dispersion type mixer for 10 minutes. The sauce was held at 100° to 105° F. until ready to be filled into pouches.

102 grams of the coated pellets were combined with 11.5 grams of the flavored sauce in a gusseted pouch similar to pouches used in retail packages of microwave popcorn. The pouch was fabricated from materials commonly used in the fabrication of pouches for microwave popcorn. The pouch did not have a microwave susceptor patch.

The bottom third of the pouch was folded up toward the open end and the coated pellets and flavored sauce were placed in the pouch so that the coated pellets and sauce rested on the folded crease. The pouch was then heat sealed and the top third of the pouch was folded down to overlap the bottom folded section.

To prepare the puffed microwave finished snack product of the present invention, the microwave snack bag article is placed in a conventional consumer microwave oven of 500 to 700 W. The article is microwave heated for about 2 to 3 minutes, depending upon the wattage of the oven. Surprisingly, a high percentage of the pellets exhibit audible popping. The microwave heating step is terminated when the rate of audible popping slows noticeably. Upon opening the bag, a flavored, puffed microwave snack was obtained.

EXAMPLE 2

A series of half product of the present invention is prepared having the following compositions:

| | Weight (lbs.) | | | |
|---|---|---|---|---|
| Ingredient | Mix 1 | Mix 2 | Mix 3 | Mix 4 |
| Corn flour | 9.0000 | 9.0000 | 9.0000 | 9.0000 |
| Tapioca starch | 8.7500 | 4.4000 | — | 4.4000 |
| Rice flour | — | 8.7500 | 4.4000 | 4.4000 |
| Wheat starch | 4.4000 | — | 8.7500 | 4.4000 |
| Salt | 0.3000 | 0.3000 | 0.3000 | 0.3000 |
| Dicalcium phosphate | 0.0690 | 0.0690 | 0.0690 | 0.0690 |
| Distilled monoglycerides[1] | 0.0346 | 0.0346 | 0.0346 | 0.0346 |

[1]Distilled monoglycerides are available from American Ingredients under the trade name Starplex 90.

The ingredients for each mix were placed in a sigma blade double arm mixer. A light coating of distilled monoglycerides was wiped on the arms of the mixer before the ingredients were added, to reduce sticking of the dough to the arms. The dry ingredients were blended for approximately two minutes. Water and colorants were added to the mix while blending.

| | Mix 1 | Mix 2 | Mix 3 | Mix 4 |
|---|---|---|---|---|
| Potable water | 12.0 lbs | 11.5 lbs | 11.0 lbs | 10.5 lbs |
| FD&C colorant used | — | Red #40 | Yellow #6 | Blue #1 |
| Colorant added | — | 4.0 g | 7.0 g | 2.0 g |
| Final temp. | 253° F. | 257° F. | 253° F. | 257° F. |
| Cook time (min) | 120 | 106 | 110 | 118 |

Colorant was added to the water in three of the batches, so that all of the pellet products could be combined for pan coating. The color results in a pleasing mixture of colored pellets which resemble "Indian Corn." Steam pressure on the mixer jacket was set at 20 psig. The mixer cover was lowered and clamped in place, and a vertically arranged hose was attached to the vent on the mixer cover so that moisture evaporating from the mix during cooking was returned to the mix. Adjustments were made in the total moisture by adding small amounts of water, or by removing the vent hose to remove small amounts of water.

The cooked dough was removed from the mixer at about 253° to 257° F., was immediately placed in the hydraulic ram pasta extruder, and was pressed through a die plate with 3/16 inch die openings. A rotating cutter blade was used to cut the extruded dough into spherical pellets. The pellets were tumble dried in a rotating drum for approximately 30 minutes with high velocity hot air at 185° F. The pellets were then dried to final moistures of 11% to 13% on perforated trays with warm air at 180° F.

Pellets were spray coated in a vented coating pan using the same equipment as used in Example 1. Coating solution was a mixture of methylcellulose 2% solution and hydroxypropyl cellulose 10% solution, combined to make a solution containing 1.7% methylcellulose and 1.7% hydroxypropyl cellulose. 14.9 lbs of this mixture was applied to 16 lbs of colored pellets, which was comprised of 4 lbs of pellets made according to the four formulas (Mix 1 through Mix 4) listed above. The coating solution was applied at a rate of 0.109 lbs per minute to the pellets with continuous drying. After application of the methylcellulose and hydroxypropyl cellulose was applied, a 2 lb sample was removed and the remaining pellets were coated with 14 lbs of methylcellulose 2% solution. Following this application, the pellets were cooled and stored in polyethylene bags.

A snack was prepared by sorting the pellets by color, placing 25 grams of the sorted pellets on a paper plate and microwaving the pellets for 100 to 113 seconds in a 650 watt microwave oven. Pellets made from mix #4 had the highest expansion volume, popped with the loudest sound, and exhibited the most movement during popping.

EXAMPLE 3

Whole popcorn was dehulled by mechanical abrasion to remove at least 90% of the pericarp. The method used was similar to the method used to prepare pearled barley.

Dehulled popcorn kernels weighing 1.0 kilograms were placed in a small inclined solid bowl coating pan rotating at 25 rpm. A 2% solution of methylcellulose was introduced to the panner using a medical atomizer attached to a compressed air source. The methylcellulose solution was added to the panner at a rate of 120 grams per hour. Warm air was directed into the pan to dry the kernels during application of the coating solution. After 400 grams of coating solution had been added, a crosslinking agent of 20 grams of 2% succinic acid was added to the pan by atomization. An additional application of 324.3 grams of 2% methylcellulose solution was added, followed by an additional 20 grams of 2% succinic acid solution. Another 426.5 grams of 2% methylcellulose solution was added, again followed by 20 grams of 2% succinic acid. Again, 336.1 grams of methylcellulose solution was added, followed by 20 grams of 2% succinic acid and a final application of 202.5 grams of 2% methylcellulose solution.

The kernels were tested by placing 25 grams of coated kernels on a paper plate and microwaving in a 650 watt microwave oven for two to three minutes. The kernels popped with significant motion. The popcorn popped with loud, audible sounds similar to the performance of popcorn which had not been dehulled.

What is claimed is:

1. A half product which audibly pops upon microwave heating, comprising:
    A. a rounded piece comprising a microwave expandable starchy composition selected from the group consisting of a cooked farinaceous dough, dehulled popcorn and mixtures thereof having a moisture content ranging from about 5% to 20% by weight of the composition, said piece having a weight of about 0.01 to 6g; and
    B. an imperforate skin completely surrounding the piece having a thickness ranging from about 25 to 50 microns and fabricated from methylcellulose having a molecular weight ranging from about 30,000 to 70,000 and exhibiting sudden failure upon microwave heating to internal temperatures of about 250° F.

2. The product of claim 1 wherein the skin is fabricated from methylcellulose having a degree of methyl substitution ranging from about 26% to 32%.

3. The product of claim 2 wherein the methylcellulose has a molecular weight ranging from about 40,000 to 50,000.

4. The product of claim 3 wherein the pieces are spherical.

5. The product of claim 4 wherein the pieces range in weight from about 0.01 to 6 g and wherein the coating comprises about 2.5% to 3.5% by weight of the pellet.

6. The product of claim 5 wherein the skin comprises about 2.5% to 3.5% by weight of the pieces and wherein the pieces range in weight from about 0.05 to 0.5 g.

7. The food product of claim 6 wherein the piece comprises a dehulled unpopped popcorn kernel.

8. The food product of claim 6 wherein the dehulled popcorn kernel is infused with a flavor or salt.

9. The food product of claim 6 wherein the starchy composition comprises a gelantinized farinaceous dough and wherein the imperforate skin is in direct contact with the dough.

10. The food product of claim 9 wherein the piece is uncasehardened and wherein the dough contains a sugar component.

11. A food product article useful in the microwave heating preparation of a snack product, comprising:
    A. a susceptor free microwave popcorn bag;
    B. a charge disposed within the bag, at least a portion of said charge comprising microwave poppable half products comprising:
        1. a rounded piece comprising a microwave expandable starchy composition having a moisture content ranging from about 5% to 20% by weight of the composition selected from the group consisting of a cooked farinaceous dough, dehulled popcorn and mixtures thereof, said piece having a weight of about 0.01 to 6 g having an imperforate skin completely surrounding the piece having a thickness ranging from about 25 to 50 microns and fabricated from methylcellulose having a molecular weight ranging from about 30,000 to 70,000 and exhibiting sudden failure upon microwave heating to internal temperatures of about 250° F.

12. The food product article of claim 11 wherein the methylcellulose has a degree of methyl substitution ranging from about 26% to 32%.

13. The food product article of claim 12 wherein the methylcellulose has a molecular weight ranging from about 40,000 to 50,000.

14. The food product article of claim 13 wherein the pellets are spherical.

15. The food product article of claim 14 wherein the pieces range in weight from about 0.01 to 6 g and wherein the coating comprises about 2.5% to 3.5% by weight of the pieces.

16. The food product article of claim 15 wherein the skin comprises about 2.5% to 3.5% by weight of the pieces and wherein the pieces range in weight from about 0.05 to 0.5 g.

17. The food product article of claim 16 wherein at least a portion of the pieces comprise a dehulled unpopped popcorn kernel.

18. The food product article of claim 17 wherein the dehulled popcorn kernel is infused with a flavor or salt.

19. The food product article of claim 16 wherein the starchy composition comprises a gelatinized farinaceous dough and wherein the imperforate skin is in direct contact with the dough.

20. The food product article of claim 19 wherein the piece is uncasehardened.

21. The food product article of claim 20 wherein the charge additionally comprises:
   2. about 1% to 15% by weight of the charge of salt.

22. The food product article of claim 21 wherein the charge additionally comprises:
   3. about 1% to 70% by weight of the charge of a fat with which the salt and pieces are intermixed.

23. A method for preparing a microwave poppable pellet, comprising the steps of:
   A. providing a plurality of microwave puffable pieces comprising a microwave expandable starchy composition having a moisture content ranging from about 5% to 20% by weight of the composition;
   B. dispersing in cold water to form an aqueous coating solution about 1% to 3% by weight of the solution of a methylcellulose having a molecular weight ranging from about 30,000 to 70,000., and
   C. evenly applying sufficient amounts of the coating solution with drying to the pieces to form imperforate evenly coated pieces having a coating thickness ranging from about 25 to 50 microns.

24. The method of claim 23 wherein the methylcellulose has a degree of methyl substitution ranging from about 26% to 32%.

25. The method of claim 24 wherein the methylcellulose has a molecular weight ranging from about 40,000 to 50,000.

26. The method of claim 25 wherein the pieces are spherical.

27. The method of claim 26 wherein the pieces range in weight from about 0.01 to 6 g and wherein the coating comprises about 2.5% to 3.5% by weight of the pieces.

28. The method of claim 27 wherein the skin comprises about 2.5% to 3.5% by weight of the pieces and wherein the pieces range in weight from about 0.05 to 0.5 g.

29. The method of claim 28 wherein the piece comprises a dehulled unpopped popcorn kernel.

30. The method of claim 29 wherein the dehulled popcorn kernel is infused with a flavor of salt.

31. The method of claim 28 wherein the starchy composition comprises a gelantinized farinaceous dough and wherein the imperforate skin is in direct contact with the dough.

32. The method of claim 31 wherein the piece is uncasehardened.

33. A method for preparing a microwave snack, comprising:
   A. providing a susceptor free microwave popcorn bag having;
      1. a charge of microwave poppable half products disposed within the bag, said half products comprising:
         a. a rounded piece comprising a microwave expandable starchy composition having a moisture content ranging from about 5% to 20% by weight of the composition selected from the group consisting of a cooked farinaceous dough, dehulled popcorn and mixtures thereof, said pellet having a weight of about 0.01 to 6 g having an imperforate skin completely surrounding the piece having a thickness ranging from about 25 to 50 microns and fabricated from methylcellulose having a molecular weight ranging from about 30,000 to 70,000 and exhibiting sudden failure upon microwave heating to internal temperatures of about 250° F.;
   B. microwave heating the bag in a consumer microwave oven to commence microwave explosively puffing at least a portion of the half products with audible popping and continuing the microwave heating until substantial termination of audible popping to form a microwave puffed snack product.

34. The method of claim 33 wherein the microwave popping bag is opaque.

35. The method of claim 34 wherein the methylcellulose has a degree of methyl substitution ranging from about 26% to 32%.

36. The method of claim 35 wherein the methylcellulose has a molecular weight ranging from about 40,000 to 50,000.

37. The method of claim 36 wherein the pellets are spherical.

38. The method of claim 37 wherein the pieces range in weight from about 0.01 to 6 g and wherein the coating comprises about 2.5% to 3.5% by weight of the pieces.

39. The method of claim 8 wherein the skin comprises about 2.5% to 3.5% by weight of the pieces and wherein the pieces range in weight from 0.05 to 0.5 g.

40. The method of claim 39 wherein at least a portion of the pieces comprise a dehulled popcorn kernel.

41. The method of claim 40 wherein the dehulled popcorn kernel is infused with a flavor or salt.

42. The method of claim 39 wherein the starchy composition comprises a gelatinized farinaceous dough and wherein the imperforate skin is in direct contact with the dough.

43. The method of claim 42 wherein the piece is uncasehardened.

44. The method of claim 43 wherein the charge additionally comprises:
   2. about 1% to 15% by weight of the charge of salt.

45. The method of claim 44 wherein the charge additionally comprises:
   3. about 1% to 70% by weight of the charge of a fat with which the salt and pieces are intermixed.

* * * * *

UNITED STATES PATENT AND TRADEMARK OFFICE
CERTIFICATE OF CORRECTION

PATENT NO. : 5,108,772
DATED : Apr. 28, 1992
INVENTOR(S) : Donald H. Wilbur

It is certified that error appears in the above-identified patent and that said Letters Patent is hereby corrected as shown below:

Col. 2, line 10 - "Product" should be -- product --.

Col. 3, line 67 - "change" should be -- charge --.

Col. 4, line 2 - "Preparing" should be -- preparing --.

Col. 4, line 22 - Insert -- . -- after $W/cc^3$.

Col. 4, line 52 - Insert -- ' -- after pellets.

Col. 10, line 19 - Insert -- diameter -- after in.

Col. 14, line 12 - "claim 6" should be -- claim 7 --.

Col. 15, line 17 - "70,000.," should be -- 70,000; --.

Col. 15, line 41 - "of salt" should be -- or salt --.

Col. 16, line 36 - "claim 8" should be -- claim 38 --.

Signed and Sealed this

Twenty-eighth Day of September, 1993

Attest:

BRUCE LEHMAN

Attesting Officer     Commissioner of Patents and Trademarks